United States Patent

Ladin et al.

[11] Patent Number: 5,823,308
[45] Date of Patent: Oct. 20, 1998

[54] CLUTCH CONTROL WITH MULTIPLE ACTUATING CYLINDERS FOR A PULL-TYPE CLUTCH

[76] Inventors: Eli M. Ladin, Ann Arbor, Mich.; Lily W. Ladin, legal representative, 1608 Morton Ave., Ann Arbor, Mich. 48104

[21] Appl. No.: 601,309
[22] Filed: Feb. 16, 1996
[51] Int. Cl.⁶ .................................................. F16D 67/02
[52] U.S. Cl. .................. 192/13 R; 192/85 C; 192/89.24
[58] Field of Search .................. 192/13 R, 85 C, 192/98, 110 B, 89.24

[56] References Cited

U.S. PATENT DOCUMENTS

| | | | |
|---|---|---|---|
| 3,912,058 | 10/1975 | Parkins | 192/13 R X |
| 4,102,446 | 7/1978 | Rist . | |
| 4,108,295 | 8/1978 | De Gennes | 192/13 R X |
| 4,142,619 | 3/1979 | Spokas | 192/13 R X |
| 4,428,417 | 1/1984 | Parker et al. | 192/85 C |
| 4,579,203 | 4/1986 | Link | 192/18 R X |
| 4,848,531 | 7/1989 | Gray et al. | 192/13 R |
| 4,991,702 | 2/1991 | Ladin . | |

*Primary Examiner*—Rodney H. Bonck
*Assistant Examiner*—Saul J. Rodriguez
*Attorney, Agent, or Firm*—Alex Rhodes

[57] ABSTRACT

A control for a heavy vehicle clutch wherein control members are moved rearwardly away from an engine to disengage a clutch from an engine and engage a clutch brake disc. A pair of co-acting multiple actuators are independently mounted at fixed locations on sides of a bell housing which encloses the clutch. The actuators are spaced apart from a longitudinal axis of the clutch and produce a resultant force which is substantially collinear with the longitudinal axis of the clutch. The actuators have outward extendable push rods which move rearwardly when a foot pedal is depressed to disengage a clutch and move forwardly when the pedal is disengaged to engage the clutch. The push rods engage a movable member which is centered on the axis of the clutch having an outer side portion for restraining the clutch brake disc from rotating when the clutch is disengaged.

18 Claims, 7 Drawing Sheets

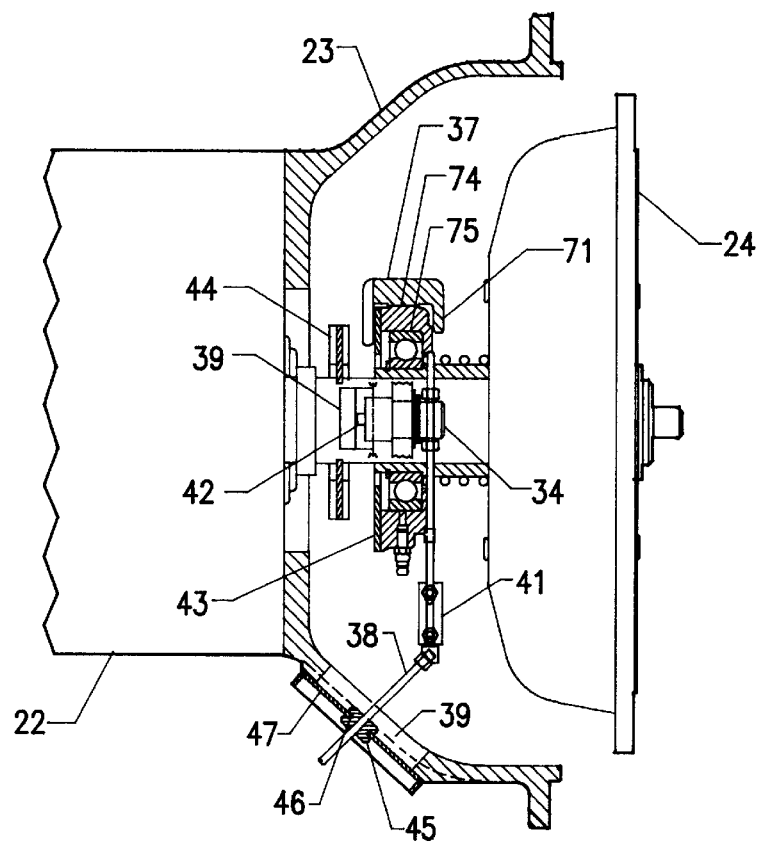
FIG. 5
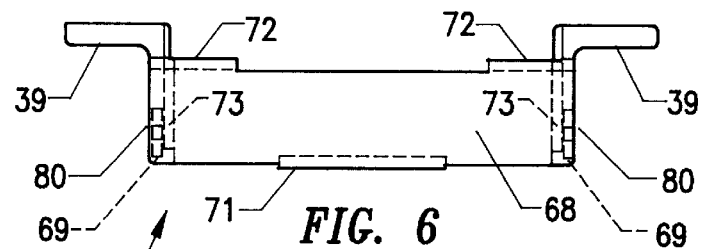
FIG. 6
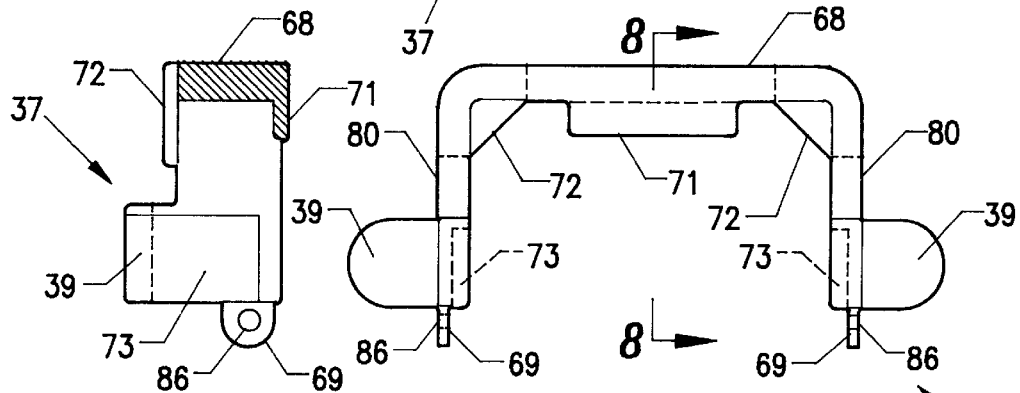
FIG. 8  FIG. 7

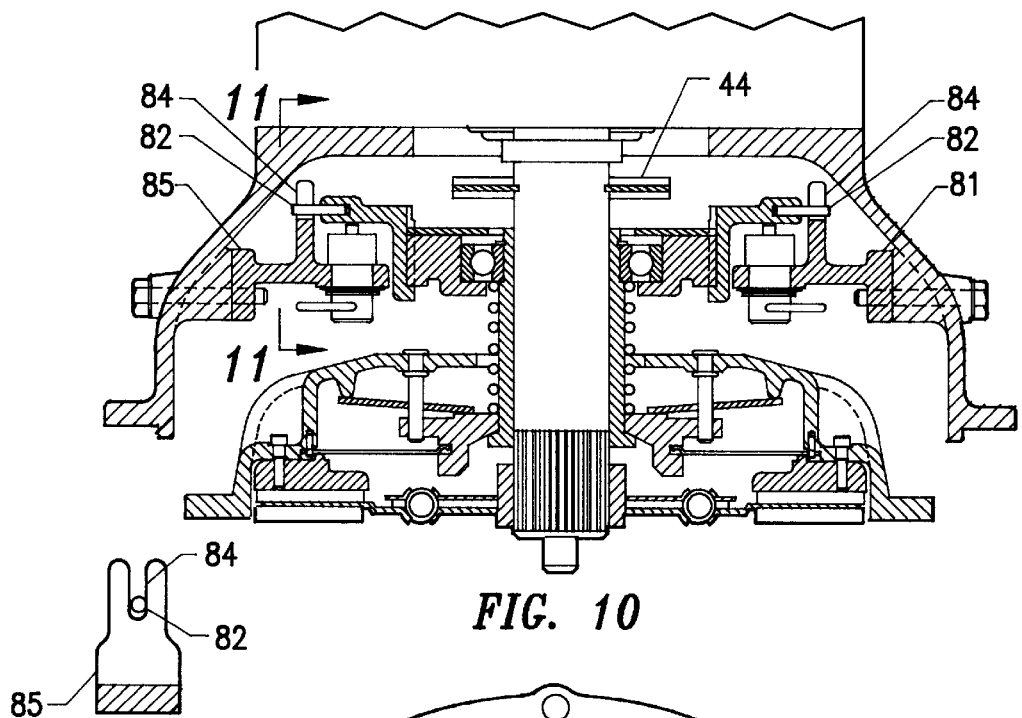
FIG. 10
FIG. 11
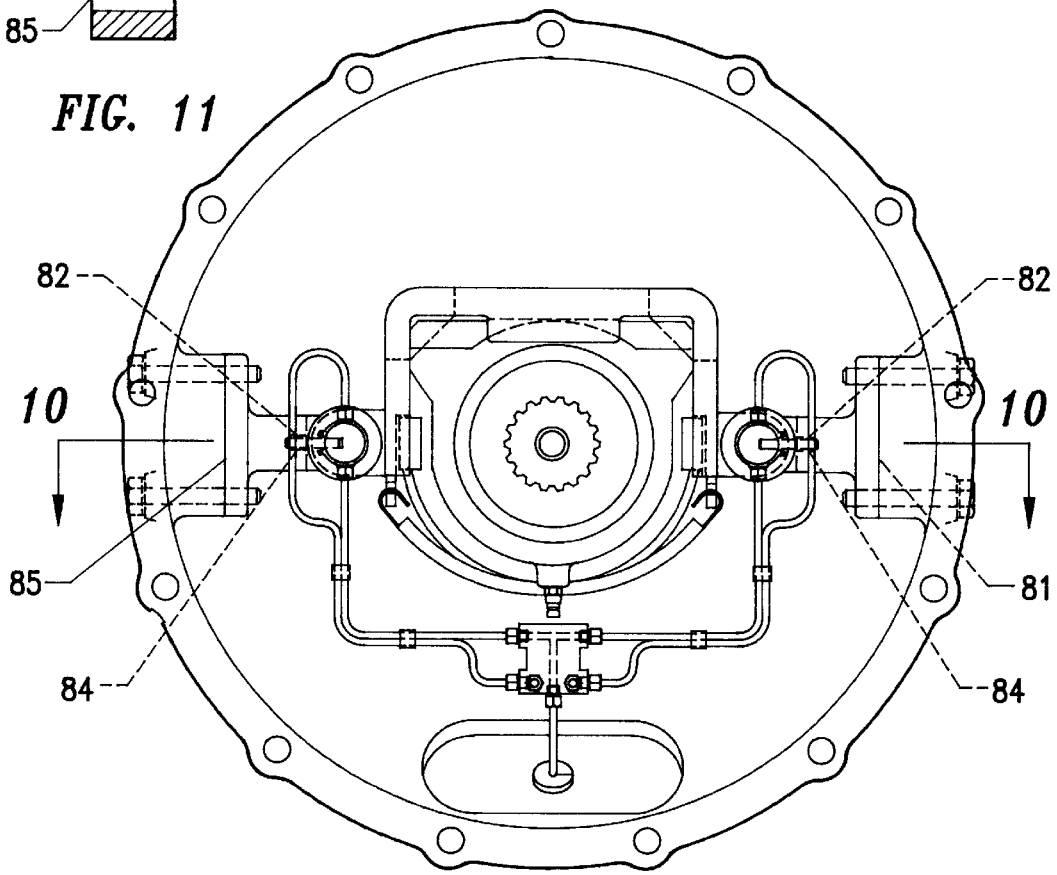
FIG. 9

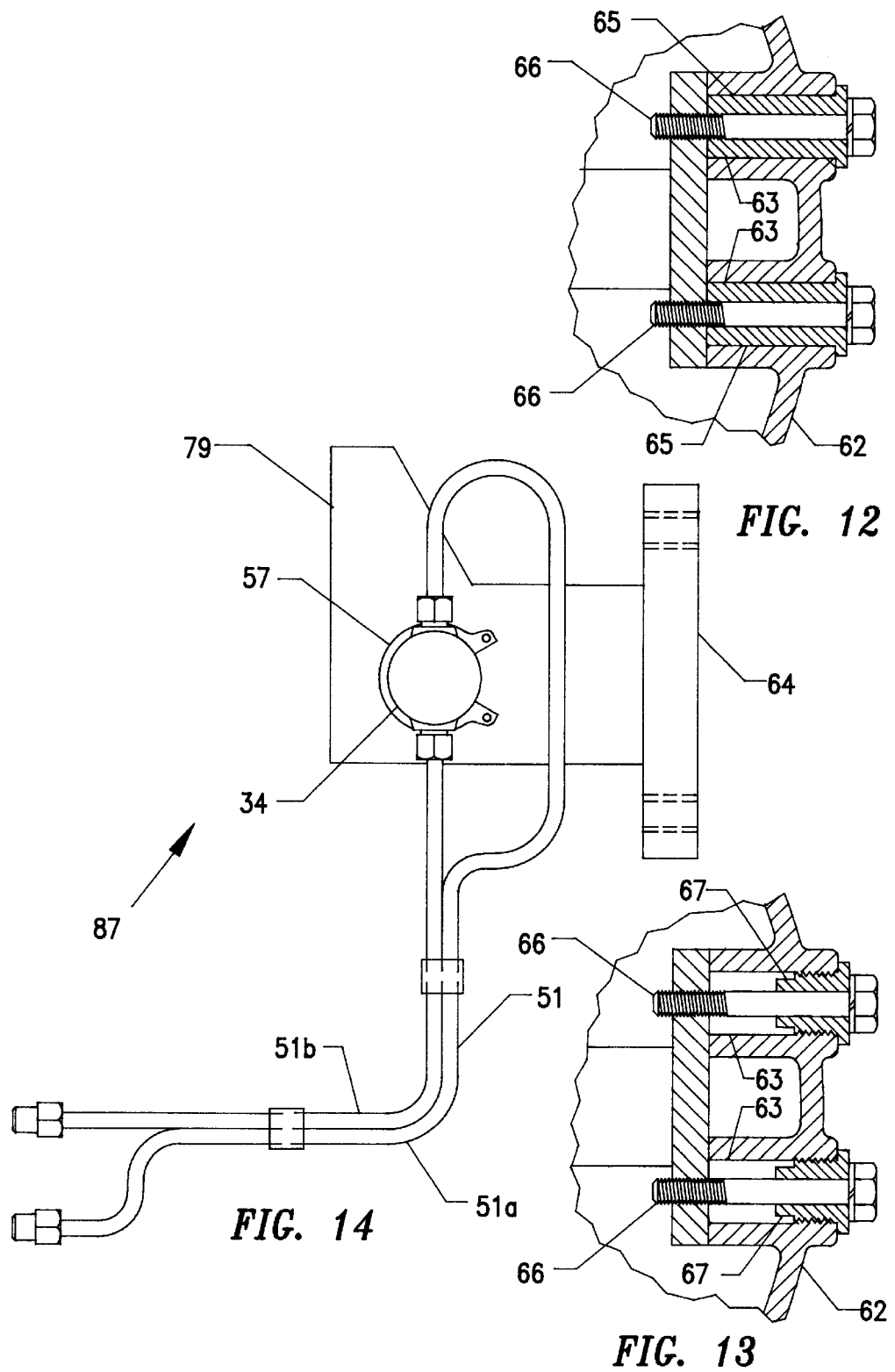

CLUTCH CONTROL WITH MULTIPLE ACTUATING CYLINDERS FOR A PULL-TYPE CLUTCH

BACKGROUND OF THE INVENTION

This invention relates to vehicle clutch controls and more particularly to a hydraulic control with multiple actuating cylinders for a "pull-type" clutch.

BACKGROUND OF THE INVENTION

In heavy vehicle clutches, release members are bearings are pulled rearwardly away from engines by forks to engage clutch brakes and disengage the clutches. The heavy vehicle clutches are commonly referred to as "pull-type" clutches to distinguish them from passenger and light vehicle clutches wherein release bearings are pushed forwardly toward engines to disengage clutches.

A major problem of both "pull" and "push" type clutches is excessive wear caused by sliding and scraping of the forks which swivel on pivots which are offset from the centers of the clutches. The inefficient geometry produces noise, chatter, vibration, contamination and heat. This geometry also increases driver clutching efforts, decreases clutch life and increases the frequency of clutch service.

In the heavy vehicles clutch wear is a more serious problem than the passenger vehicles and light trucks because of higher disengaging forces and more frequent clutch usage. Furthermore, because of a need to limit driver efforts, only small amounts of clutch plate travel can be provided in "pull-type" clutches. Consequently, "pull-type" clutches require more frequent repairs and adjustments to compensate for wear. Clutch repairs and adjustments are undesirable because they increase vehicle operating costs and remove expensive vehicles from service.

U.S. Pat. No. 4,991,702, entitled "Motor Vehicle Clutch Control With Co-Acting Multiple Actuators Mounted Apart From the Axis of a Clutch" discloses the inventive concept of a control which eliminates the troublesome clutch fork.

SUMMARY OF THE INVENTION

The present invention, which is directed to "pull-type" clutches, is a development of my U.S. Pat. No. 4,991,702 which is incorporated herein by reference. U.S. Pat. No. 4,991,702 is primarily directed to "push-type" clutches not having clutch brakes, commonly used in passenger vehicles and light trucks.

One benefit of the invention is that it improves the operation of a "pull-type" clutch. Another benefit, in addition to the foregoing benefit, is that it increases the life of a "pull-type" clutch system. Another benefit, in addition to the foregoing benefits, is that it reduces the frequency of clutch adjustments. Another benefit, in addition to the foregoing benefits, is that it reduces driver foot pedal efforts. Another benefit, in addition to the foregoing benefits, is that it can be easily installed in existing vehicles. Another benefit, in addition to the foregoing benefits, is that it be readily inspected and repaired.

One distinguishing feature of the invention is that it is specifically adapted to "pull-type" clutches. Another distinguishing feature is that multiple co-acting cylinders produce a rearward force along the axis of a clutch. Another distinguishing feature is that the multiple actuating cylinders are independently mounted on opposite sides of a bell housing which encloses a clutch. Another distinguishing feature is that mountings of the multiple actuators react the torque of a clutch brake.

In the first aspect of the invention, the control is adaptable to new and existing vehicles. The control is comprised of a foot control; a master hydraulic cylinder; a pair of rearward acting slave cylinders; a pair of slave cylinder mounting brackets; a thrust yoke; a release bearing assembly; a release sleeve; interconnecting hydraulic lines and bleed and fill components.

In a second aspect of the invention, the thrust yoke is eliminated. The slave cylinders act directly on a release bearing assembly.

Further benefits and features of the invention will become apparent from the ensuing detailed description and drawings which disclose the invention. The property in which exclusive rights are claimed is set forth in each of the numbered claims at the conclusion of the detailed description.

BRIEF DESCRIPTION OF THE DRAWINGS

The invention will be better understood and further objects, characterizing features, details and advantages thereof will appear more clearly with reference to the diagrammatic drawings illustrating a presently preferred specific embodiment of the invention by way of non-limiting example only.

FIG. 5 is a cross-sectional view taken on the line 5—5 in FIG. 2.

FIG. 6 is an enlarged plan view of a thrust yoke.

FIG. 7 is a front view of the thrust yoke.

FIG. 8 is a cross-sectional view taken on the line 8—8 in FIG. 7.

FIG. 9 is a cross-sectional view of an optional means for reacting clutch brake torque alternate taken in a similar manner as FIG. 4.

FIG. 10 is a cross-sectional view taken on the line 10—10 in FIG. 9.

FIG. 11 is a cross-sectional view taken on the line 11—11 in FIG. 10.

FIG. 12 is a cross-sectional view taken on the line 12—12 in FIG. 3.

FIG. 13 is a cross-sectional view of an optional slave cylinder mounting.

FIG. 14 is an enlarged front view of a slave cylinder and mounting bracket sub-assembly.

DESCRIPTION OF THE PREFERRED EMBODIMENT

Figure 1:
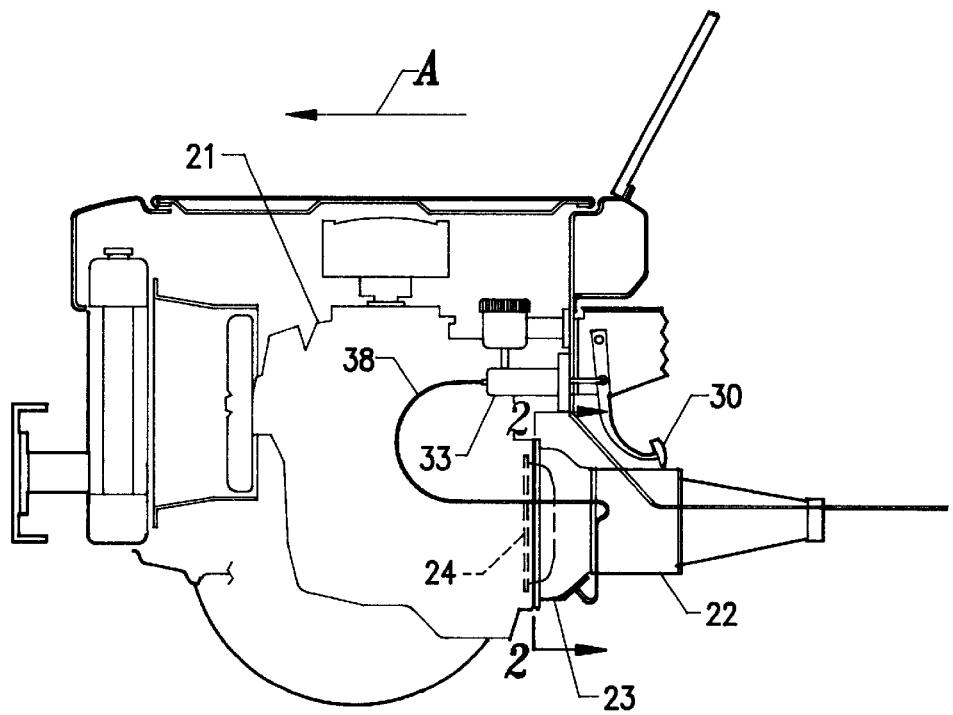
FIG. 1 is a longitudinal cross-sectional view of a front portion of a heavy commercial vehicle having a clutch control according to the present invention.
Figure 2:
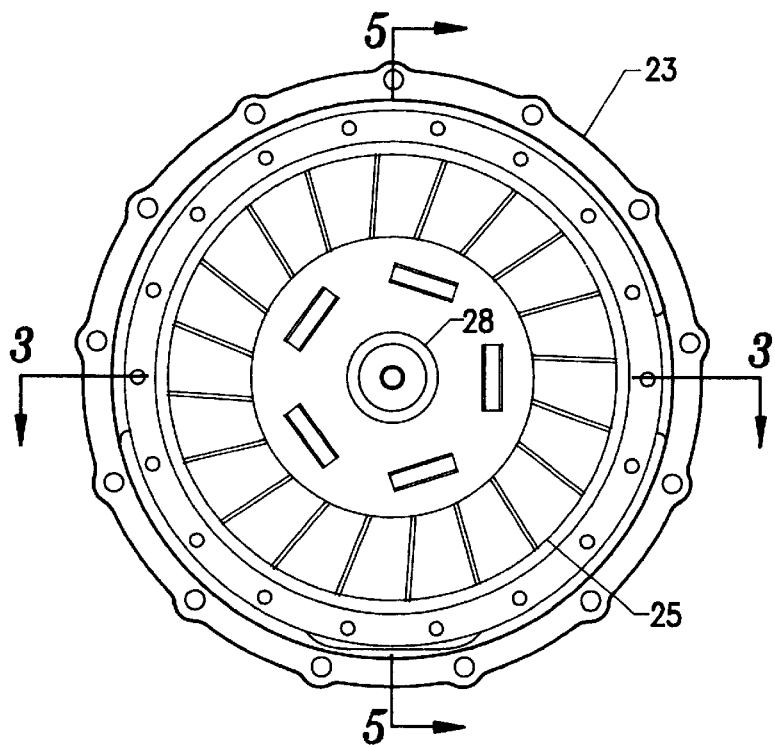
FIG. 2 is an enlarged cross-sectional view taken on the line 2—2 in FIG. 1.

Referring now to the drawings wherein like numerals designate like and corresponding parts throughout the several views, a first embodiment of a clutch control for a "pull-type" clutch 24 according to the invention is shown in FIGS. 1 through 14, inclusive. The forward direction in the drawings is depicted in FIG. 1 by the arrow "A".

Figure 3:
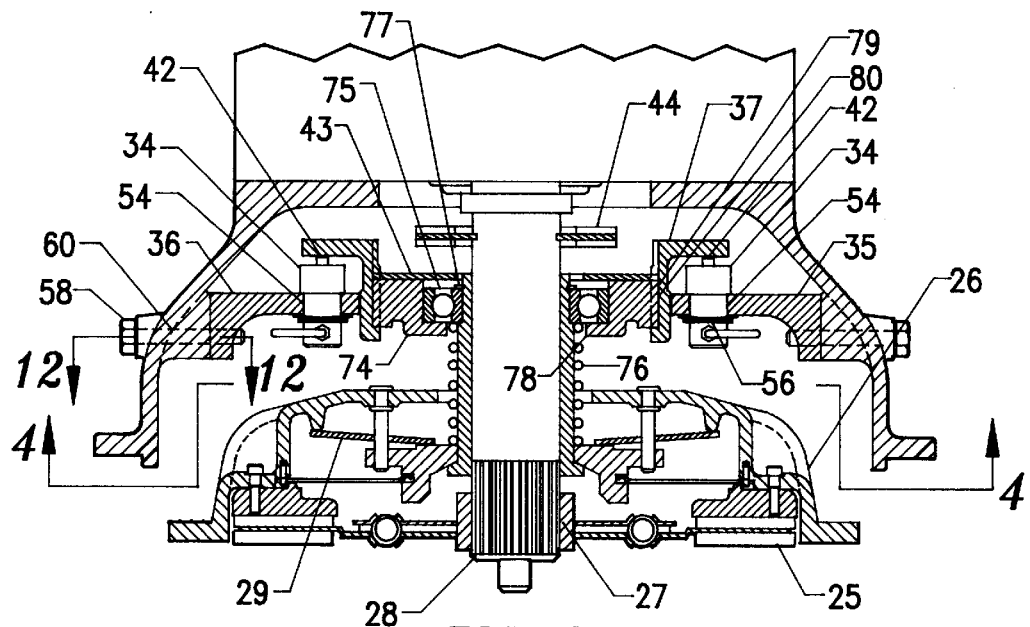
FIG. 3 is an enlarged cross-sectional view taken on the line 3—3 in FIG. 2.

An engine 21 is connected to a transmission 22 by a bell housing 23. Inside of the bell housing 23 is a conventional "pull-type" 24 clutch which transmits the engine output torque to the transmission 22. Referring to FIG. 3, the "pull-type clutch 24 includes a friction plate 25 and a pressure plate assembly 26. The friction plate 25 is slidable on a spline 27 of a transmission input shaft 28 and when it is engaged with the engine 21 it is tightly pressed against a flywheel (not shown) by a diaphragm spring 29.

When a foot pedal 30 is depressed, a release bearing assembly 31 and a release sleeve 32 are moved rearwardly to cancel pressure of the diaphragm spring 29 against the friction plate 25 and disconnect the engine 21 from the transmission 22, commonly referred to as disengaging a clutch.

The control for a "pull-type" clutch 24 is broadly comprised of the foot pedal 30, a master hydraulic cylinder 33, a pair of identical co-acting slave cylinders 34, a pair of slave cylinder mounting brackets 35 and 36, a thrust yoke 37, the release bearing assembly 31, the release sleeve 32, and hydraulic lines and fittings. One benefit of the control is that, except for the master cylinder 33 and a hydraulic line 38, all of the hydraulic components are located inside of the bell housing 23, thereby reducing their exposure to contamination from water, salt and dirt.

The master cylinder 33 is conventional and serves as a pressure source for the slave cylinders 34, it being understood that pressure can also be supplied by other sources, such as pumps and accumulators. The master cylinder 33 is mechanically connected to the foot pedal 30 and when the foot pedal 30 is depressed, hydraulic fluid flows out of the master cylinder 33 causing pressure to be applied to the slave cylinders 34.

When pressure is applied to the slave cylinders 34, push rods 42 move rearwardly out of the cylinders 34 to move the thrust yoke 37, release bearing assembly 31 and release sleeve 32 away from the engine 21 and disengage the clutch 24. When the release bearing assembly 31 is moved reawardly, a housing cover 43 (part of the release bearing assembly) contacts a brake disc 44 which is fixed to the transmission input shaft 28. The brake disc 44 rotates with the shaft 28 when the clutch 24 is engaged and is restrained against rotation by the housing cover 43 when the clutch 24 is disengaged.

Figure 4:
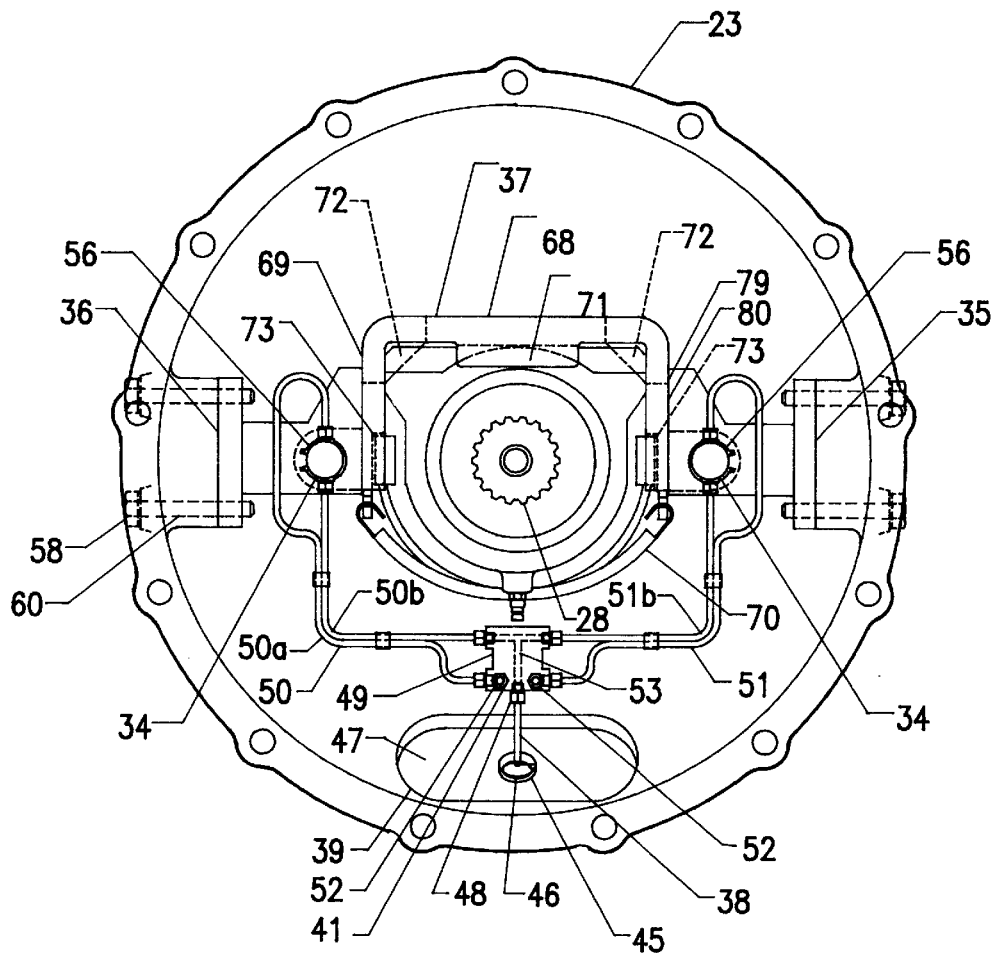
FIG. 4 is a cross-sectional view taken on the line 4—4 in FIG. 3.

Referring now to FIGS. 4 and 5, the slave cylinder push rods 42 are equidistant from the longitudinal centerline of the clutch 24 and contact front surfaces of outward extending thrust pads of the thrust yoke 37. When pressure is applied to the slave cylinders 34, the push rods 42 press against the thrust pads 39 and produce a resultant force at the longitudinal centerline of the clutch 24 to overcome the force of the diaphragm spring 29 against the friction plate 25.

With reference again to FIGS. 4 and 5, the hydraulic line 38 from the master cylinder 33 enters the bell housing 23 through a split grommet seal 45 which is retained in an aperture 46 of a stamped cover 47. The aperture 46 is larger than the fitting 48 at the end of the line 38 to allow assembly of the line 38 with the cover 47. The grommet seal 45 is first assembled to the line 38 and then installed in the cover 47. The cover 47 is detachably mounted to a lower portion of the bell housing 23 and covers a large opening 39 in the bell housing 23. Similar openings exist in current bell housings for inspecting and adjusting clutches.

After the hydraulic line 38 enters the bell housing 23, the line is connected to a lower portion of a generally rectangular junction block 49. Two short pairs of lines 50, 51 extend upwardly to the pair of slave cylinders 34. The lower line 50a, 51a of each pair of lines 50, 51 is an air bleed line and connects a port on a lower side portion of the junction block 49 to a port on the upper portion of a slave cylinder 34. It is used for bleeding (i.e. removing) air from the cylinder 34 via a bleed screw 52 of the front of the junction block 49. The upper line 50b, 51b of each pair of lines 50, 51 is a fluid line and connects a port on an upper side portion of the junction block 49 with a port on a lower portion of a slave cylinder 34. The fluid lines communicate with each other and the line 38 from the master cylinder 33 via passages 53 in the junction block 49.

The slave cylinder mountings are best understood by reference to FIGS. 3, 4 and 14. Each slave cylinder 34 extends rearwardly through an aperture 54 of an inverted "L" shaped bracket and is retained in the bracket 55 with a conventional retaining ring 56. Each "L" bracket 55 has a vertical portion 57 which is attached to an inner side portion of the bell housing 23 with a pair of conventional threaded fasteners 58. Horizontal portions 59 of the slave cylinder brackets 55 which retain the slave cylinders 34 extend inwardly towards the center of the bell housing 23. The fasteners 58 are installed through apertures 60 in the sides of the bell housing 23 and threadably engage the vertical portions 57 of the "L" brackets 55.

Figure 18:
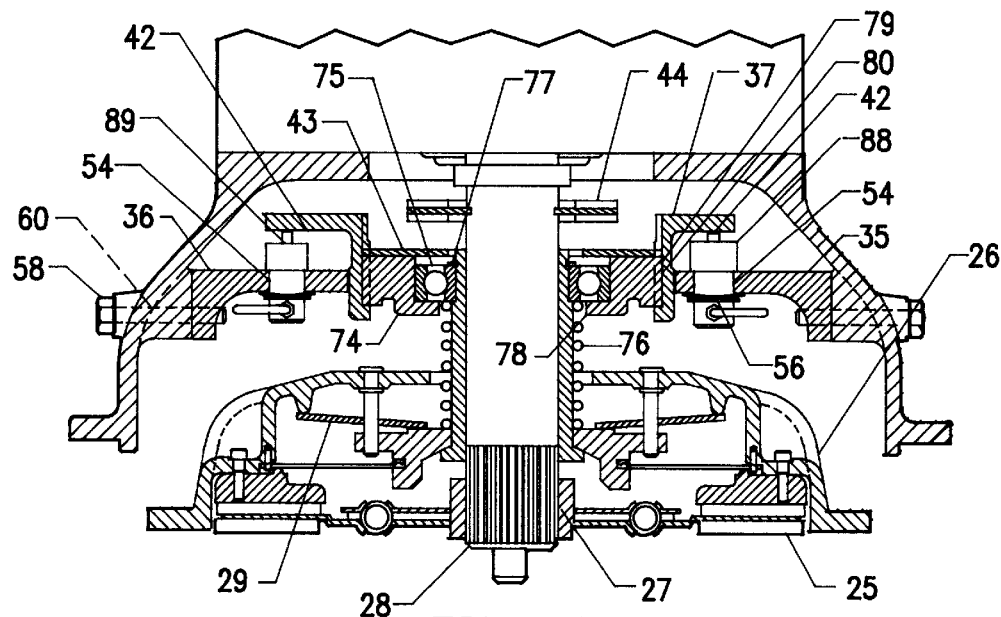
FIG. 18 is a cross-sectional view taken on the line 18—18 of FIG. 17.
Figure 17:
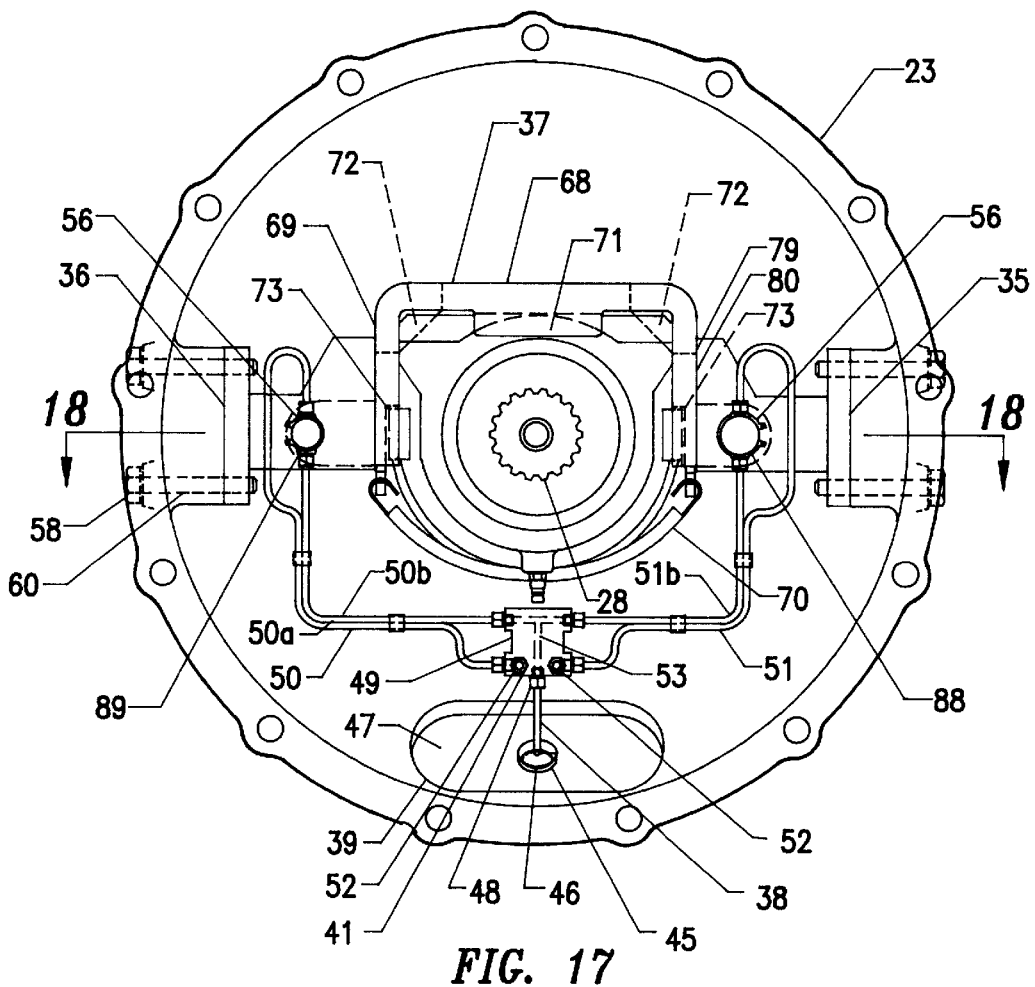
FIG. 17 is a view which is similar to FIG. 4 except for unequal diameter slave cylinders.

Although two slave cylinders 34 are shown in the drawings, as shown in FIGS. 17 and 18 more than two or unequal diameter cylinders 88 and 89 can be used, so long as the cylinders 34 are spaced equidistant from the center of the clutch 24 and/or their diameters are adjusted to compensate for differences in spacing. It will also be appreciated that compressed air can be used in instead of hydraulic fluid.

In FIG. 12, a slave cylinder mounting is shown for an existing bell housing 62. Two pairs of holes 63 are commonly provided in the sides of existing housings for mounting clutch fork cross-shafts (not shown) at optional positions. When a clutch fork and cross-shaft are eliminated, these holes 63 become available for attaching slave cylinder mounting brackets 64. The holes 63 in FIG. 12 are sized with sleeves 65 to accommodate standard threaded fasteners 66. Either sleeves 65 as shown in FIG. 12, self-threading bushings 67 as shown in FIG. 13, or any suitable spacer can be used for accommodating the standard fasteners 66.

The thrust yoke 37 (see FIGS. 6–8) which moves the release bearing assembly 31 rearwardly is an inverted "U" shaped member having an upper horizontal portion 68 and adjoining downward extending vertical side portions 69. The bottom of the thrust yoke 37 is open to install the thrust yoke 37 on the release bearing assembly 31. An extension spring 70 extends across the open bottom portion and the ends of the spring 70 attach to apertures 86 in the side portions 69 of the yoke 37 to vertically retain the yoke 37 to the bearing assembly 31. The yoke 37 is retained longitudinally to the bearing assembly 31 by a short downward extending front portion 71, a pair of inward extending rear corner portions 72 and a pair of recesses 73 in the yoke's side portions 69 which overlap top and side portions of the release bearing assembly 31.

Referring again to FIGS. 3 and 4, the release bearing assembly 31 is conventional and consists of a release bearing housing 74, a release bearing 75 and the release bearing housing cover 43. The release bearing 75 is mounted on the release sleeve 32 which is slidable on the transmission input shaft 28. The release bearing assembly 31 is longitudinally positioned on the release sleeve 32 by a coil spring 76 and a snap ring 77. The bearing 75 is retained in the bearing housing 74 by a shoulder 78 and the housing cover 43 which is fixed to the rear of the housing 74. The housing cover 43 is a thin hardened steel plate and as previously described engages the brake friction disc 44 when the clutch 24 is disengaged.

The slave cylinder mounting brackets 35, 36 serve dual functions. They mount the slave cylinders 34 and restrain the brake disc 44 from rotating when the housing cover 43 contacts the brake disc 44. The restraining function can be understood by observing the juxtaposed relationship of the inner vertical side portions 79 of the mounting brackets 35, 36 and the outer sides 80 of the thrust yoke 37. When the bearing housing cover 43 contacts the brake disc 44, the inner sides 79 of the mounting brackets prevent the brake disc 44 from rotating.

In FIGS. 9 through 11, an optional construction is shown for restraining the brake disc 44. In the optional construction outward extending cylindrical pins 82 in a thrust yoke 83 closely engage slots 84 in rearward extending portions of slave cylinder mounting brackets 81, 85.

Existing vehicles can be easily retrofitted with my invention in the following manner. The initial step consists of removing a clutch fork and a clutch fork cross-shaft (not shown). The bell housing 62 is then modified as shown in FIG. 12 by installing spacers 65 in the cross-shaft holes 63. The thrust yoke 37 is inserted upwardly through the inspection and service opening 46 in the bottom of the bell housing 62 and engaged with the release bearing assembly 31 as shown in FIGS. 3 and 4. Thereafter, the extension spring 70 is attached to the apertures 86 in the lower end portions of the thrust yoke 37 (see FIGS. 7 and 8) to retain the thrust yoke 37 to the bearing assembly 31.

After the thrust yoke 37 has been mounted on the bearing assembly 31, a pair of slave cylinder and tube sub-assemblies 87 are prepared as shown in FIG. 12. Each sub-assembly 87 consists of a slave cylinder 34, a slave cylinder mounting bracket 35, a retaining ring 57, and a pair 51 of short lines 51a, 51b. The subassemblies 87 are next inserted upwardly through the bell housing opening 46 and attached to the sides of the bell housing 62 with threaded fasteners 66 as shown in FIG. 12. The tubes 50, 51 are connected to the junction block 49 which is inserted through the housing opening 46. The line 38 is connected to the bottom of the junction block 49 and the opposite end of the line is connected to the master cylinder 33. The system is filled with fluid at the master cylinder 33 and air is bled through the bleed screws 52. The grommet 45 is assembled to the line 38 and the cover 47 is attached to the bell housing 62.

Figure 15:
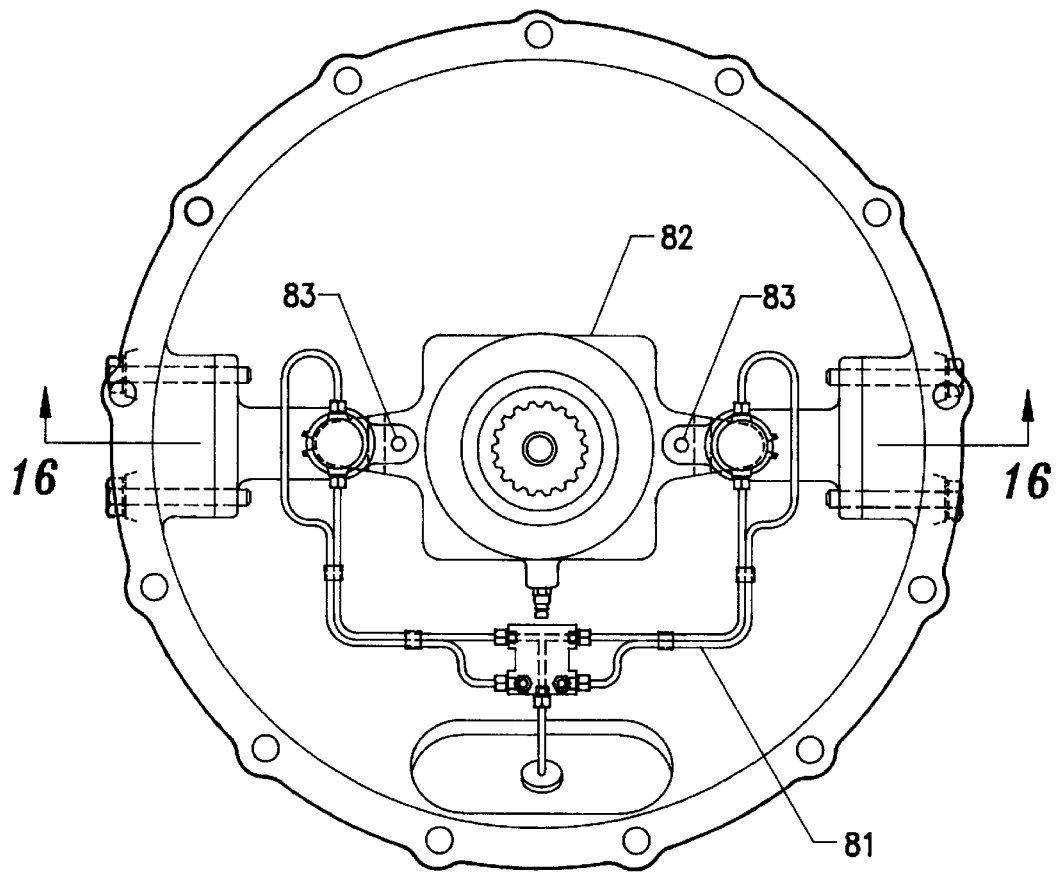
FIG. 15 is a cross-sectional view of an alternate embodiment taken in a similar manner as FIG. 4.
Figure 16:
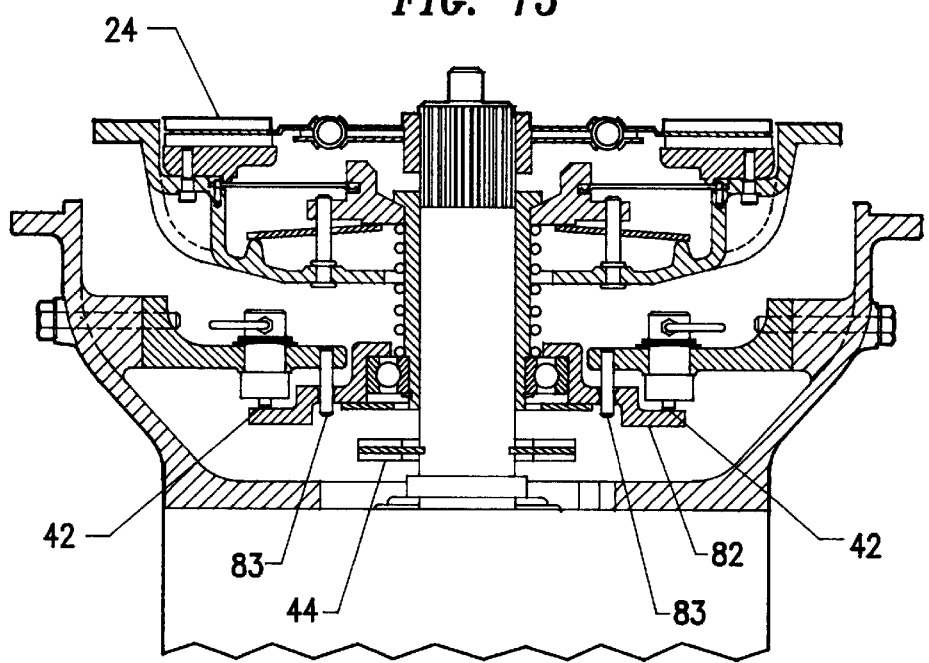
FIG. 16 is a cross-sectional view taken on the line 16—16 in FIG. 15.

Referring now to FIGS. 15 and 16, a second embodiment is shown wherein the thrust yoke 37 of FIGS. 3 and 4 is eliminated. In the second embodiment 81, slave cylinder push rods 42 act directly on a modified release bearing assembly 82. A pair of cylindrical pins 83 mounted in a slave cylinder "L" bracket 84 extends rearwardly from the cylinder mounting bracket 84 and engage apertures 85 in the release bearing assembly 82 to restrain the clutch brake disc 44 when the clutch 24 is disengaged.

From the foregoing, it will be understood that the hydraulic control for a heavy vehicle "pull-type" clutch which is disclosed herein provides important benefits heretofore unavailable in the existing art of "pull-type" clutches.

Although but several embodiments of my invention have been illustrated and described, it will be appreciated that other embodiments can be developed by changes in material, shape, arrangement and substitution of parts without departing from the spirit thereof. For example, a pair of slave cylinders having different diameters may be used by adjusting their offsets from the longitudinal axis of the clutch to produce a resultant force which acts along said axis of said clutch.

I claim:

1. A control for selectively engaging and disengaging a "pull-type" vehicle clutch from an engine, comprising: release sleeve for movement on a transmission input shaft; a release bearing assembly mounted on said release sleeve for movement with said release sleeve; a clutch brake disc fixedly mounted on said transmission shaft; an inverted "U" shaped thrust yoke mounted on said release bearing for said movement with said release sleeve and said release bearing assembly to activate said clutch brake disc and disengage said clutch from said engine, said thrust yoke having at least one outer side portion for restraining said clutch brake disc from rotating when said clutch is disengaged; at least two co-acting actuators operatively connected to a common pressure source for moving said thrust yoke, each of said actuators being independently mounted at a fixed position on a bell housing which encloses said vehicle clutch, said actuators further having extendable push rods for engaging said thrust yoke; a bracket for mounting each of said actuators to a side of said bell housing, at least one of said brackets having an inner side portion in juxtaposed and cooperative relationship to said thrust yoke clutch brake disc restraining portion, and a common pressure source operatively connected to said actuators for extending said push rods away from said clutch.

2. The control as recited in claim 1 wherein said actuators are hydraulic actuators.

3. The control as recited in claim 1 wherein said actuators are pneumatic actuators.

4. A control for selectively engaging and disengaging a "pull-type" vehicle clutch from an engine, comprising: at least two co-acting hydraulic actuators operatively connected to a common pressure source for producing a resultant force which is collinear with a longitudinal axis of a "pull-type" clutch, each of said hydraulic actuators being in a bell housing which encloses said vehicle clutch, and having an extendable push rod in an interior portion of said bell housing having an end portion which moves away from said engine when pressure is applied to said hydraulic actuator from said common pressure source to disengage said clutch and moves toward said engine when said pressure from said pressure source is reduced to engage said clutch; a clutch brake disc centered on said longitudinal axis of said clutch; and a movable member centered on said longitudinal axis between said engine and said clutch brake, said movable member having a pair of thrust pads spaced apart from said axis for engaging said ends of said push rods and said movable member further having at least one outer portion for restraining said clutch brake disc-from rotating when said movable member is moved away from said engine by said push rods during said disengagement of said clutch.

5. A control for selectively engaging and disengaging a "pull-type" vehicle clutch from an engine, comprising: at least two co-acting actuators operatively connected to a common pressure source for producing a resultant force which is collinear with a longitudinal axis of a "pull-type" clutch, each of said actuators being independently mounted at a fixed position on a side of a bell housing which encloses said vehicle clutch, and having an extendable push rod which moves away from said engine when pressure is applied to said actuator from said common pressure source to disengage said clutch and moves toward said engine when said pressure from said pressure source is reduced to engage said clutch; a clutch brake disc centered on said longitudinal axis of said clutch; a movable member centered on said longitudinal axis between said engine and said clutch brake, said movable member having thrust pads spaced apart from said axis for engaging said push rods and further having at least one outer portion for restraining said clutch brake disc from rotating when said movable member is moved away from said engine by said push rods during said disengagement of said clutch; and an "L" shaped bracket for independently mounting each of said actuators at a fixed position on a side of said bell housing, said "L" bracket having an outer vertical portion for attaching said "L" bracket to said side of said housing and an adjoining horizontal portion for receiving one of said actuators.

6. The control as recited in claim 5 wherein said actuators are identical actuators, spaced equal distances from said longitudinal axis of said clutch.

7. The control for selectively engaging and disengaging a "pull-type" clutch recited in claim 5 wherein said outer portion of said movable member for restraining said clutch brake disc from rotating is a cylindrical pin extending outwardly from a side of said movable member.

8. A control for selectively engaging and disengaging a "pull-type" clutch with an engine, comprising: a clutch brake disc fixedly mounted on a transmission input shaft; a movable member; at least one pair of independently mounted hydraulic actuators, each of said actuators being fixedly attached to a side of a bell housing which encloses said clutch and having an extendable member for moving said movable member away from said engine to disengage said clutch from said engine; an "L" shaped bracket for fixedly attaching each of said actuators to said bell housing, each of said brackets having an outer vertical portion for attaching said bracket to said bell housing and a horizontal portion for attaching one of said actuators, at least one of said brackets having an inward extending horizontal portion in juxtaposed relationship to said movable member for restraining said clutch brake disc from rotating when said movable member engages said clutch brake disc.

9. In a motor vehicle of the class having an engine; a "pull-type" clutch; a bell housing, fixedly mounted to said engine, for enclosing said "pull-type" clutch, said bell housing having a pair of apertures extending through opposite sides of said housing; a rotatable transmission input shaft for receiving output torque from said engine; a release sleeve mounted for movement on a transmission input shaft; a release bearing assembly mounted on said release sleeve for movement with said release sleeve; a clutch brake disc fixedly mounted on said transmission shaft, the improvement comprising: a pair of brackets for independently mounting a pair of co-acting hydraulic actuators to the sides of said bell housing, each of said brackets having an outer vertical side portion, said outer vertical side portion having a pair of threaded apertures which are aligned with one of said pair of apertures extending through said sides of said bell housing and an adjoining inward extending horizontal portion for mounting one of said co-acting actuators, said inward extending portion having an inner portion for restraining said clutch brake disc from rotating when said clutch is disengaged; an inverted "U" shaped thrust yoke having an upper portion, adjoining side portions and an open lower portion mounted on said release bearing assembly for movement with said release sleeve and said release bearing assembly to activate said clutch brake disc and disengage said clutch from said engine, said thrust yoke having outer side portions in juxtaposed relationship to inner portions of said "L" brackets for restraining said clutch brake disc from rotating when said clutch is disengaged; a pair of co-acting hydraulic actuators operatively connected to a common pressure source for moving said thrust yoke, each of said actuators being mounted on one of said "L" brackets, said actuators further having extendable push rods for engaging and moving said thrust yoke; and a common pressure source operatively connected to said actuators for extending said push rods.

10. In a motor vehicle of the class having an engine; a "pull-type" clutch a bell housing fixedly mounted to said engine for enclosing said "pull-type" clutch, said bell housing having a pair of apertures extending through opposite sides of said housing, and a pair of co-acting hydraulic actuators in an interior portion of said housing for engaging and disengaging a "pull-type" clutch, the improvement comprising: a pair of brackets for independently mounting said pair of co-acting hydraulic actuators to the sides of said bell housing, each of said brackets having an outer vertical side portion, said outer vertical side portion having a pair of threaded apertures which are aligned with one of said pairs of apertures extending through a side of said bell housing and an inward extending horizontal portion for mounting one of said co-acting actuators; and a pair of co-acting hydraulic actuators operatively connected to a common pressure source for moving said thrust yoke, said actuators being mounted on "L" brackets, said actuators further having extendable push rods for selectively engaging and disengaging said clutch from said engine.

11. In a motor vehicle of the class having an engine; a "pull-type" clutch; a housing fixedly attached to a rear of said engine for enclosing said "pull-type" clutch; a transmission input shaft which is rotatable about a longitudinal centerline of said housing for receiving output torque from said engine, a clutch brake disc fixedly mounted on said transmission shaft, and a control for selectively engaging and disengaging said "pull-type" clutch from said engine, said control having a movable member for disengaging said clutch from said engine, the improvement comprising: at least two co-acting actuators mounted at fixed locations in an interior of said housing on opposite sides of said longitudinal centerline of said bell housing for producing a resultant force when pressure is applied to said cylinders which is substantially collinear with a longitudinal centerline of said clutch, each of said actuators having an extendable member in an interior portion of said housing for actuating said brake disc to restrain said input shaft from rotating; and a pressure source operatively connected to said actuators for moving said extendable actuator members.

12. The improvement recited in claim 11 further comprising a pair of brackets for independently mounting each of said actuators at fixed locations on said sides of said bell housing.

13. The improvement as recited in claim 11 wherein said actuators have equal diameters.

14. In a motor vehicle of the class having an engine; a rotatable transmission input shaft for receiving output torque from said engine; a "pull-type" clutch for transmitting said engine torque to said transmission input shaft; a housing for enclosing said "pull-type" clutch; a clutch brake disc fixedly mounted on said transmission input shaft; and a movable member mounted on said transmission input shaft for simultaneously engaging said clutch brake disc and disengaging said clutch from said engine, the improvement comprising: at least two co-acting actuators independently mounted in an interior portion of said housing at fixed locations on opposite sides of said bell housing, each of said actuators having an extendable member for moving said movable member on said transmission input shaft away from said engine to disengage said clutch from said engine; a pressure source operatively connected to said actuators for moving said actuator members; and a bracket for mounting each of said actuators on a side of said housing, at least one of said brackets having an inner portion in juxtaposed and cooperative relationship to said movable member for restraining said clutch brake disc from rotating when said movable member engages said clutch brake disc.

15. A control for selectively engaging and disengaging a "pull-type" vehicle clutch enclosed in a bell housing with an engine and actuating a brake for restraining a transmission input shaft during said disengagement of said clutch, comprising; a movable member centered about a longitudinal axis of said transmission input shaft; a release bearing having an outer portion fixed to said movable member and an inner portion mounted on a release sleeve; a release sleeve mounted for axial movement on said transmission input shaft; a clutch brake disc fixedly mounted on said transmission input shaft; and at least one pair of independently mounted co-acting hydraulic actuators, each of said co-acting actuators being independently mounted at a fixed position to a side of said bell housing which encloses said clutch and having a rearward extendable member in an interior portion of said bell housing for moving said movable member away from said engine to restrain said clutch brake disc from rotating and disengage said clutch from said engine.

16. A control for selectively engaging and disengaging a "pull-type" clutch with an engine and restraining a clutch brake disk from rotating, comprising: a foot pedal; a master hydraulic cylinder mechanically connected to said foot pedal for supplying hydraulic pressure to a pair of co-acting hydraulic slave cylinders mounted in an interior portion of a bell housing which encloses said clutch; a movable member for disengaging a clutch and restraining a clutch brake disc from rotating; at least one pair of co-acting slave cylinders in an interior portion of said bell housing which encloses said clutch, said actuators being mounted at fixed positions on opposite sides of a longitudinal centerline of said bell housing and each of said cylinders having an extendable member for displacing said movable member to disengage said clutch from an engine and restraining said clutch brake disk from rotating when hydraulic pressure is applied to said slave cylinders from said master cylinder; a junction block in the interior of said bell housing having a passageway for operatively connecting said pair of co-acting slave cylinders to said master cylinder; a pair of hydraulic lines in the interior of said bell housing for connecting said junction block to said slave cylinders; a hydraulic line having one end portion connected to said master cylinder and an opposite end portion connected to said junction block; and a means for removing air from said clutch control.

17. In a motor vehicle of the class having an engine; a "pull-type" clutch; a housing fixedly attached to a rear of said engine for enclosing said "pull-type" clutch; a transmission input shaft which is rotatable about a longitudinal centerline of said housing for receiving output torque from said engine, a clutch brake disc fixedly mounted on said transmission shaft, and a control for selectively engaging and disengaging said "pull-type" clutch from said engine having a movable member mounted on said transmission input shaft for disengaging said clutch from said engine, the improvement comprising: at least one pair of said actuators having unequal diameters mounted at fixed locations on opposite sides of said longitudinal centerline of said bell housing for producing a resultant force when pressure is applied to said cylinders which is substantially collinear with a longitudinal centerline of said clutch, each of said actuators having an extendable member for moving said movable member on said transmission input shaft away from said engine to disengage said clutch from said engine and restrain said brake disc from rotating and a pressure source operatively connected to said actuators for moving said extendable actuator members.

18. In a motor vehicle of the class having an engine; a clutch; a bell housing attached to a rear portion of said engine for enclosing said clutch; a transmission input shaft in the interior of said bell housing which is rotatable about a longitudinal centerline of said housing for receiving an output torque of engine, a brake centered about said transmission input shaft for restraining said input shaft during a disengagement of said clutch from said engine, and a control for selectively engaging and disengaging said clutch from said engine, the improvement comprising: said control having at least one pair of co-acting hydraulic actuators having rearward extendable members in an interior of said bell housing, said rearward extendable members for simultaneously disengaging said clutch and for actuating said brake during said disengagement of said clutch to restrain a rotation of said transmission input shaft.

* * * * *